June 15, 1965 R. E. CURRIE, JR 3,189,794

RELAY BINARY CIRCUIT

Filed May 24, 1962 3 Sheets-Sheet 1

INVENTOR.
ROY E. CURRIE, JR.

BY [signature]
C. A. Phillips
ATTORNEYS

June 15, 1965 R. E. CURRIE, JR 3,189,794

RELAY BINARY CIRCUIT

Filed May 24, 1962 3 Sheets-Sheet 2

INVENTOR.
ROY E. CURRIE, JR.

BY

ATTORNEYS

INVENTOR.
ROY E. CURRIE, JR.
BY
[signature]
C. A. Phillips
ATTORNEYS

United States Patent Office 3,189,794

Patented June 15, 1965

3,189,794

RELAY BINARY CIRCUIT

Roy E. Currie, Jr., Huntsville, Ala., assignor to the United States of America as represented by the Administrator of the National Aeronautics and Space Administration Filed May 24, 1962, Ser. No. 197,548

11 Claims. (Cl. 317—140)

(Granted under Title 35, U.S. Code (1952), sec. 266)

The invention described herein may be manufactured and used by or for the Government of the United States of America for governmental purposes without the payment of any royalties thereon or therefor.

This invention relates to counting and logic circuits and particularly to those employing relay binary elements singularly or in combination. Electrical binary circuits, circuits which will retain indefinitely either of two stable electrical states and can be caused to make abrupt transitions frim one state to the other, are widely employed in pulse circuitry. Perhaps the largest use is in the field of electrical counting. While the most publicized forms of binary circuits have been of the purely electronic type, employing vacuum tubes or transistors, electromechanical types employing relays have found many applications where relatively low rates of counting, on the order of 100 cycles per second or less, are encountered. An example of a relay type binary circuit is contained in U.S. Patent 2,635,197 to Routledge et al.

An examination of known types of relay binary circuits reveals that they suffer from one or more of the following deficiencies: they lack versatility such as being basically restricted in operation to trailing or leading edges of input pulses without choice; their reliability or circuit life is short because of such factors as requiring that relays break high currents; the transition times between binary stages are too great; their input pulse width requirements are unduly long; and some suffer from an excessive number of components and thus are too costly to compete with purely electronic types.

It is the object of this invention to overcome the aforesaid difficulties and to provide a much improved form of relay binary circuit.

In accordance with the invention, a dual coil, double-throw, double-acting or latching relay is energized by selectively coupling a first charged capacitor through a first unidirectional current flow element to one of the coils to switch the throw of the relay to one of its positions, and by coupling a second charged capacitor through a second unidirectional current flow element to the other of the coils to switch the throw of the relay to the other of its positions. Means are also provided to sequentially charge the capacitors in response to an input pulse which energizes a set of normally open and a set of normally closed contacts. One of these sets of contacts is connected in a common path between the capacitors and the coils of the latching relay and the other set connects the source of charging current through the appropriate set of closed contacts of the latching relay to charge the capacitor which is in circuit position to next switch the latching relay.

Other features, objects and advantages of the present invention will be apparent from the following detailed description when considered together with the accompanying drawings in which.

Figure 1:
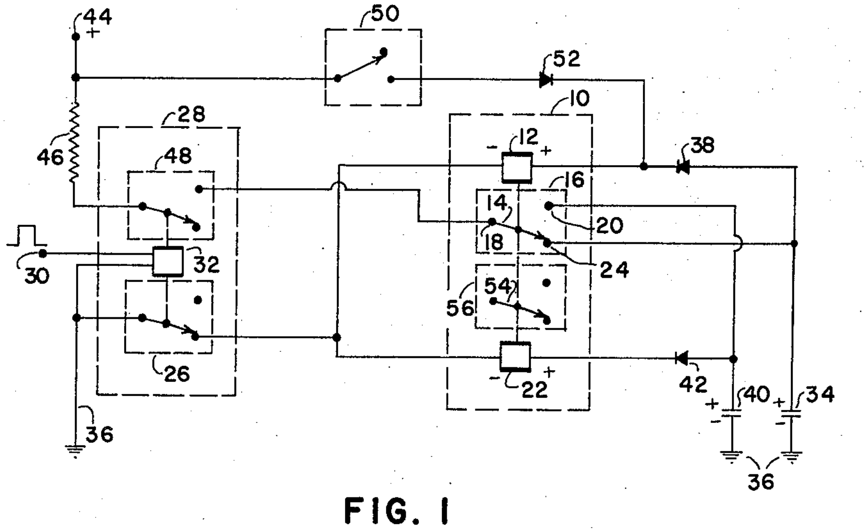
FIGURE 1 is an electrical schematic circuit diagram of an embodiment of the invention adapted to switch on the trailing edge of an input pulse.

Referring now to the drawings, wherein like reference characters designate like corresponding parts throughout the several views, the relay binary shown in FIGURE 1 employs as a basic switching element latching relay 10 which is of the double acting type, that is to say, when pickup coil 12 of relay 10 is energized, armature operated movable contact 14, of single-pole, double-throw contacts 16 shifted to a position to complete a circuit between terminals 18 and 20 where it remains, holds or latches, and when coil 22 of relay 10 is energized, movable contact 14 is shifted to a position to produce circuit contact between terminals 18 and 24 where it remains until electrically shifted back. This action may be obtained in several known ways. For example, the armature may be so mounted that a toggle action is obtained with the two extreme positions of the armature being conditions of stability. Alternately, the armature may engage a mechanical or magnetic latch in the operated position, this latch being disengaged by energizing the coil which tends to move the armature from the latched position. One terminal of coils 12 and 22 is commonly returned to circuit ground through normally closed relay contacts 26 of double-pole, double-throw input relay 28. Relay 28 is operated by positive input pulses applied through terminal 30 to input relay coil 32.

Capacitor 34 is connected between the circuit ground 36 and the otherwise unconnected terminal of relay coil 12 through diode 38, which is poled to pass current from capacitor 34 through coil 12 in accordance with the polarity which would be as shown with the top plate of capacitor 34 being positive with respect to the bottom plate. Similarly, capacitor 40 is connected between between common circuit ground 36 and relay coil 22 through diode 42 and is poled to pass the indicated polarity on capacitor 40 which is positive at the top plate and negative at the bottom plate. Charging current for capacitors 34 and 40 is provided from positive source input terminal 44 through current limiting resistor 46, normally open contacts 48 of relay 28, and movable contact 14 of latching relay 10.

The circuit also features reset means consisting of single-pole, single-throw switch 50 and unidirectional conductor or diode 52 connected in circuit between positive terminal 44 and the uncommon terminal of coil 12 of relay 10, with diode 52 being poled to allow current flow from positive terminal 44 through coil 12. In addition, the movable contact 54 of a second, or auxiliary, set of single-pole, double-throw contacts 56 are mechanically linked to and function in unison with contacts 16 in order to provide means of switching any desired external circuit which, of course, is a purpose of the circuit. It is to be understood that more than one set of auxiliary contacts may be employed, as would be determined by the number of switching functions which are to be performed in unison.

To go through the operations of the circuit of FIGURE 1, assume that a positive switching pulse is applied through input terminal 30 to coil 32 of input relay 28. As a result, relay contacts 26 open and contacts 48 close during the pulse. Tracing the resulting circuit it will be observed that current will flow from positive terminal 44 through resistor 46, contacts 48, between contacts 18 and 24, and charge capacitor 34 positive with respect to common ground. Since contacts 26 are open, there will be no current flow from positive terminal 44 through diode 38, relay coil 12 and contacts 26 to ground, nor will there be any flow through diode 38, coil 12, coil 22, and diode 42 to capacitor 40, since current flow in this direction is blocked by the polarity position of diode 42 which is poled to pass current in the opposite direction. At the conclusion of the first input pulse, input relay contacts 48 will open and contacts 26 close. With this posture, capacitor 34 discharges through diode 38, coil 12, and switch contacts 26 with the result that movable contact 14 of relay 10 is moved, or switched, in circuit between terminals 18 and 20 of relay 10. As the moving arm 54 of auxiliary contacts 56 is also moved, the desired external switching function is simultaneously accomplished.

With the occurrence of a second input pulse, coil 32 is energized to close a current path through contacts 48 and across contacts 14 and 20 to capacitor 40. Capacitor 40 will then charge and, in view of the blocking action of diode 38 and the fact that contacts 26 are open, the charge will remain on capacitor 40. At the end of the input pulse, contacts 48 will again open and contacts 26 close with the result that capacitor 40 discharges through diode 42 and coil 22 to cause the movable arm 14 to move to its original position between contacts 14 and 24 and thus one complete cycle of operation is completed. In the manner just described, relay switching occurs at the trailing edge of input pulses. It will be observed that it requires two input pulses to complete the cycle and to switch auxiliary contacts 56. The functional result is that switching logic in the form of division by two, with respect to applied input pulses, is produced. Reset of relay 10 to a home position, in this instance with movable arm 14 closing contacts 18 and 20, may be achieved at any time by closing switch 50 to energize, through diode 52, coil 12. If movable arm 14 is not already in its home position it will be moved there by coil 12.

Figure 2:
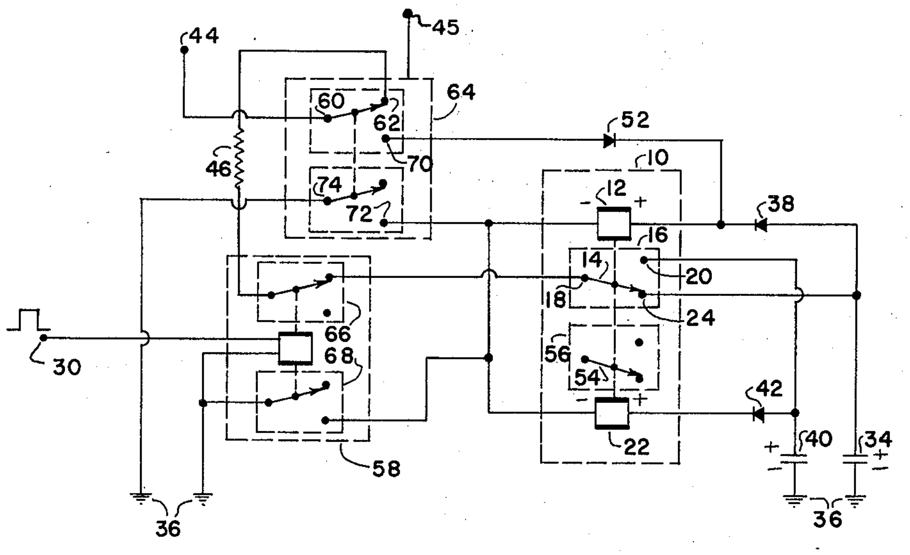
FIGURE 2 is an electrical schematic circuit diagram differing from FIGURE 1 in that the circuit is adapted to switch on the leading edge of an input pulse.

The binary circuit set forth in FIGURE 2 is adapted to switch on the leading, rather than the trailing, edge of input pulses and except for the interchange of the normally open and normally closed contacts of the input relay and the modified reset circuitry the binary circuit is identical to the one set forth in FIGURE 1. With input relay 58 in its resting state, as illustrated, current will flow from positive terminal 44 between contacts 60 and 62 of double-pole, double-throw reset switch 64, through current limiting resistor 46, normally closed contacts 66 of input relay 58, and contacts 18 and 24 of relay 10 to charge, in the polarity indicated, capacitor 34. With the application of an input pulse to input relay 58, the contact positions of relay 58 are reversed with the result that source terminal 34 is disconnected from capacitor 34 and a discharge path is completed through diode 38, coil 12, normally open contacts 68 and ground. With coil 12 thus energized, movable member 14 is pulled up in circuit between relay contacts 18 and 20. At the termination of the input pulse, relay 58 switches to close the supply circuit from terminal 34, and current flows through contacts 18 and 20 to charge capacitor 40. With the application of another pulse to relay 58, the supply circuit to capacitor 40 is disconnected and the discharge circuit through diode 42, coil 22, switch contacts 68 and ground is closed resulting in the movable contact 14 of relay contacts 16 being pulled down by coil 22 to its original position to close the circuit between contacts 18 and 24 of relay 10. In the manner just described, the binary circuit of FIGURE 2 produces a switching of auxiliary movable contact 54 of contacts 56 coincident with the leading edge of each input pulse and a complete cycle of switching for each two input pulses.

Reset of the circuit of FIGURE 2 to a position with movable contacts 14 and 54 of relay 10 in their upper position is achieved by switching reset switch 64 to its reset, lower position by applying a reset pulse thereto through terminal 45. This closes a circuit from source terminal 44, through contacts 60 and 70, diode 52, coil 12, contacts 72 and 74 of reset switch 64 to ground to thus energize coil 12 and pull movable contacts 14 and 54 up, if they are not already in this position.

Figure 3:
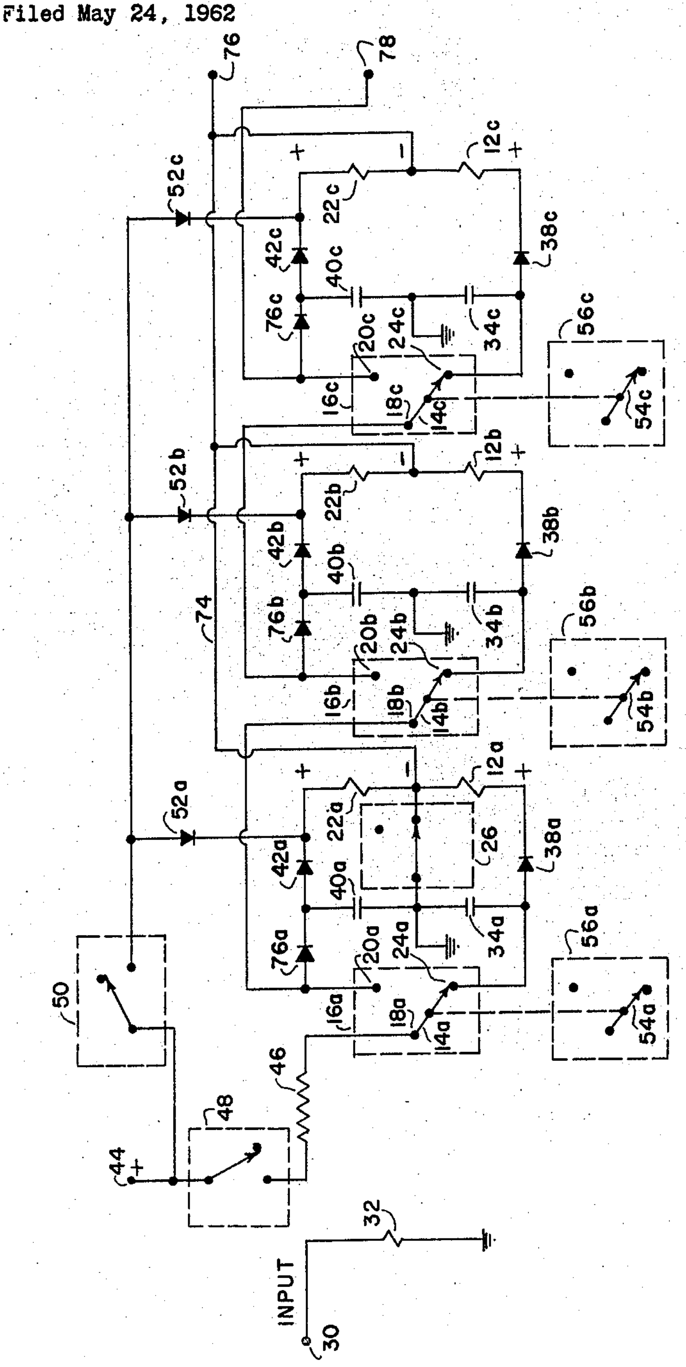
FIGURE 3 is an electrical schematic circuit diagram of a three-stage relay binary counter-divider employing a chain of binary stages of the type illustrated in FIGURE 1.

The three stage binary counter-divider circuit illustrated in FIGURE 3 employs the basic individual stage design shown in FIGURE 1 with an important exception, that input relay 28 need not be duplicated for each stage, only one, shown by its components, being required for the whole divider. An additional diode is used for isolation in each stage followed by another stage, but its cost is substantially less than the omitted relay and of course there is the important difference that the diode has no moving parts. For convenience in examination, the diagram has been simplified by omitting the mechanical link between relay coils and contacts, and suffixes of *a*, *b*, and *c* are employed to distinguish identical parts as between the first, second, and third stages, respectively.

To consider operation of the divider, assume that a first positive pulse is applied through input terminal 30 to energize input coil 32. Energized coil 32 then closes contacts 48 which close the circuit from positive source terminal 44 through contacts 48, 18*a*, and 24*a* to capacitor 34*a* of the first stage. As a result capacitor 34*a* charges during the pulse. At the termination of this first pulse, contacts 48 open and contacts 26 close. Capacitor 34*a* then discharges through diode 38*a*, coil 12*a* and contacts 26, and movable contacts 14*a* and 54*a* are raised by coil 12*a* to an upper position. It is to be noted that contacts 26, illustrated in the first stage, are common to all stages by virtue of being connected between ground and the common conductor 76 which is common to all latching relay coils, coils 12*a*–12*c* and 22*a*–22*c*, in the circuit.

Figure 4:
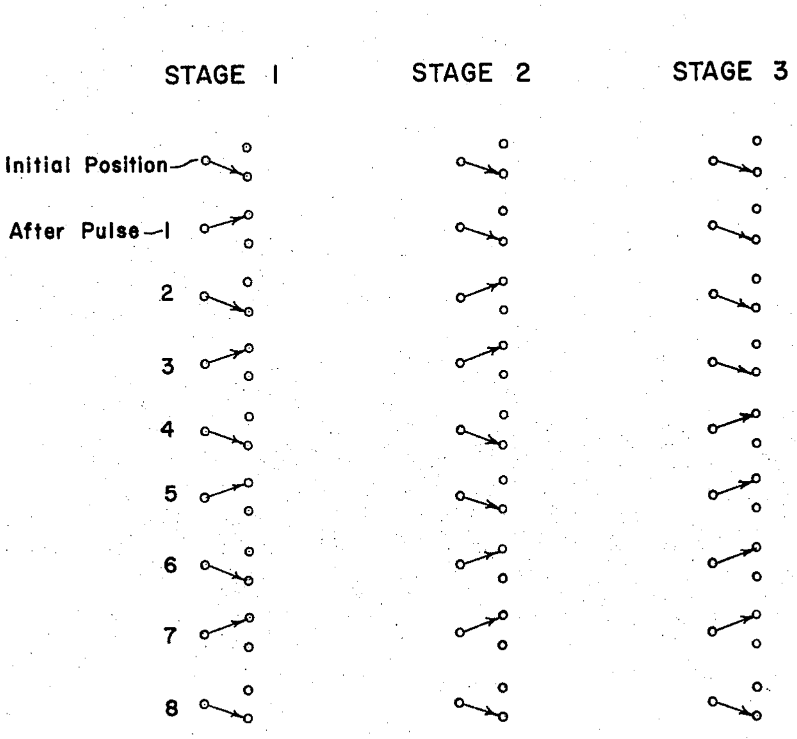
FIGURE 4 is a diagram illustrating the operation of the counter-divider of FIGURE 3.

As an aid to following the complete sequence of operation of the counter-divider, FIGURE 4 illustrates the condition of one of the movable contacts of relays 10*a*, 10*b*, and 10*c* at the conclusion of each input pulse.

With the application of a second input pulse to coil 32, contacts 48 again close and this time a charging current is fed through contacts 18*a* and 20*a* and isolation diode 76*a* to capacitor 40*a*, and through contacts 18*a*, 20*a*, 18*b*, and 24*b*, and diode 76*b* to capacitor 34*b* of the second stage. At the end of the second pulse, capacitor 40*a* energizes coil 22*a* to pull movable contacts 14*a* and 54*a* down to their lower position and capacitor 34*b* energizes coil 12*b* to pull movable contacts 14*b* and 54*b* to their upper position. In both instances contacts 26 complete the energizing paths through the common discharge path which couples all common or negative labeled coil terminals of coils 12*a*–12*c* and 22*a*–22*c* to contacts 26.

The application of a third pulse to input relay coil 32 creates a charging path solely through relay contacts 18*a* and 24*a* to capacitor 34*a* and at the end of this pulse movable contacts 14*a* and 54*a* are moved to their upper position by the discharge of capacitor 34*a* through coil 12*a*. Relay contacts 16*b* in the second stage are unaffected by the third pulse.

A fourth input pulse produces a charging path through contacts 18*a* and 20*a* and diode 76*a* to capacitor 40*a*, through contacts 18*a*, 20*a*, 18*b*, and 20*b* and diode 76*b* to capacitor 40*b* and through contacts 18*a*, 20*a*, 18*b*, 20*b*, 14*c* and 24*c* to capacitor 34*c*. At the conclusion of this pulse, capacitor 40a energizes coil 22a to lower movable contacts 14a and 54a, capacitor 40b energizes coil 22b to lower movable contacts 14b and 54b and capacitor 34c energizes coil 12c to raise movable contacts 14c and 54c. Circuit operations continue in the same manner with the result that at the end of the fifth pulse, movable contacts 14a and 54a are raised and the other movable contacts are unaffected. The sixth pulse results in movable contacts in the first two stages reversing position, with those in the third stage remaining stationary. At the end of the seventh pulse only the movable contacts 14a and 54a of the first stage are moved, in this instance to their upper position, which brings all movable contacts to their upper positions. At the conclusion of the eighth pulse all movable contacts are returned to their down, or original position. It is thus seen that eight input pulses are required to complete a switching cycle of the third and last stage movable contacts, and thus that the circuit will perform division by eight with respect to an input pulse train. An additional like binary stage connected to terminals 76 and 78, as the third stage was connected to the second stage, would provide as an output, division by 16. In a like manner a further additional stage or stages may be employed to achieve division by higher multiples of two. Binary counting or addition is also accomplished by the circuit as will be apparent from the switch positions shown in FIGURE 4. The circuit will count to 2, 3 or 8, with 8 being the recycling count and thus representing 0 or 8. To count with the circuit, let a raised movable arm in the first column represent 1, in the second column 2, and in the third column represent 4. As an example, after 7 pulses have occurred the first, second, and third stage contacts are up representing 1+2+4 or 7. Reset of all stages to their original position is obtained by closing switch 50 and energizing coils 22a, 22b and 22c through diodes 52a, 52b and 52c.

In addition to the counter-divider circuit described above, the binary circuit of this invention may be employed to achieve greater accuracy and reliability in many different types of binary circuits., such as ring counters, decade counters, registers, shift shifters and the like. Fast and certain binary switching is achieved by the high impulse discharge of the storage capacitors directly through the switching relays. At the same time long relay contact life is assured by the resistance provided in capacitor charging paths. Further, the circuit will operate with very short input pulses. As as example, employing 28 volt standard commercial relays of the magnetic latching type, together with eight microfarad capacitors and a charging circuit resistance of 10 ohms, reliable switching has been obtained with input pulse widths no longer than five milliseconds in duration.

Stability is enhanced by the insertion of diodes 76a, b and c which serve to make each stage independent and prevent interstage capacitor coupling.

The number of binary circuit components is held to two capacitors, one relay and three diodes per binary stage with a single relay and resistor as an input circuit regardless of the number of stages. Auxiliary reset circuitry requires a single additional switch 50 for the circuit as a whole and one diode 42 for each stage. By means of switch 50 positive source terminal 44 is connected through a separate diode 42 to coil 22 of each stage and as thus energized all double-throw relay contacts are reset to a common position. As illustrated in FIGURE 3 this common position would be the lower position. To achieve reset to the opposite position, the reset interconnection would be across coil 12 instead of coil 22. The cost of components to achieve a comparable switching rate and power level of operations is substantially lower than that obtainable by other means such as employ tubes or transistors and with event of this invention comparable reliability is assured. Accuracy is in general enhanced over the tube and transistor variety due to a lower susceptibility to stray noise voltages, it requiring a greater amplitude signal to trigger the input relay than in many instances would be required to trigger a tube or transistor. Stated differently, within its range of operation, the invention successfully obtains the advantages of purely electronic switching such as long circuit life, and eliminates such objections to electronic switching as substantially higher cost and circuit susceptibility to false triggering when used in environments of high electrical noise.

Obviously, many other modifications and variations of the present invention are possible in the light of the above teachings. It is, therefore, to be understood that within the scope of the appended claims the invention may be practiced other than as specifically described.

What is claimed is:

1. A relay binary circuit comprising:

(A) an input relay including an energizing coil for actuating a first and second movable contact, (i) each of said movable contacts having two fixed contacts operatively associated therewith;

(B) a source of direct current having one terminal thereof connected to said first movable contact of said input relay and the other terminal thereof connected to a common terminal of said binary circuit;

(C) a double-throw relay having at least a movable contact and two fixed contacts, (i) a first coil of said double-throw relay positioned to move said movable contact in circuit with one of said fixed contacts and a second coil of said double-throw relay positioned to move said movable contact in circuit with the other of said fixed contacts, (ii) said movable contact being connected to one of said fixed contacts associated with said first movable contact of said input relay;

(D) first and second power storage capacitors connected via said common terminal through said second movable contact of said input relay and one of said fixed contacts associated therewith to a common terminal of said first and second double-throw relay coils, (i) the remaining free terminal of said first capacitor being connected to one of said fixed contacts of said double-throw relay and the remaining free terminal of said second capacitor being connected to the other of said fixed contacts, (ii) said storage capacitors being charged by said source of direct current when said first movable contact of said input relay and said movable contact of said double-throw relay are electrically connected;

(E) a first unidirectional conductor being connected in a first series circuit through said first coil between the uncommon terminal of said first capacitor and said common terminal of said double-throw relay coils;

(F) a second unidirectional conductor being connected in a second series circuit through said second coil between the uncommon terminal of said second capacitor and said common terminal of said double-throw relay coils, (i) said unidirectional conductors being poled to pass current flow in the same direction through said common terminal of said relay coils, (ii) said first and second capacitors, said fixed contacts, and said series circuits being poled to permit current flow to the capacitor which is in circuit to energize the said coil adapted to shift said movable contact to its other contact position.

2. The relay binary circuit set forth in claim 1 wherein current limiting means is connected between said source of direct current and said first movable contact of said input relay for limiting the current flow to said storage capacitors.

3. The relay binary set forth in claim 2 wherein said first movable contact of said input relay is normally open and said other second movable contact of said input relay is normally closed thereby rendering said relay binary responsive to the trailing edge of a positive going electrical actuating signal applied to said input relay.

4. The relay binary circuit set forth in claim 2 wherein a reset relay for returning said binary circuit to a predetermined condition is electrically connected into said binary circuit;

(A) said reset relay including first and second movable contacts each of which have two fixed contacts operatively associated therewith, (i) said first movable contact being electrically connected to said source of direct current, (a) the normally closed fixed contact associated with said first movable contact being electrically connected to said first movable contact of said input relay, (b) the normally open fixed contact associated with said first movable contact being electrically connected to one of said double-throw relay coils;

(ii) said second movable contact being electrically connected to said common terminal, (a) the normally open fixed contact associated with said second movable contact being electrically connected to said common terminal of said first and second double-throw relay coils; and (B) said first movable contact of said input relay is normally closed while said second movable contact of said input relay is normally open thereby rendering said relay binary responsive to the leading edge of a positive going electrical pulse applied to said input relay.

5. The relay binary set forth in claim 2 further comprising reset means for resetting the position of said double-throw relay to one of its two positions.

6. The binary circuit set forth in claim 5 wherein said reset means comprises means for applying a switching potential solely across one of said coils.

7. The binary circuit set forth in claim 5 wherein said double-throw relay has an auxiliary set of double-throw contacts.

8. A relay binary circuit comprising:

(A) an input relay including an energizing coil for actuating a first and second movable contact, (i) each of said movable contacts having two fixed contacts operatively associated therewith;

(B) a plurality of succeeding binary stages each comprising:

(i) a double-throw relay having at least a movable contact and a first and second fixed contact, (a) a first coil of said double-throw relay positioned to move said movable contact in circuit with one of said fixed contacts and a second coil of said double-throw relay positioned to move said movable contact in circuit with the other of said fixed contacts, (ii) first and second storage capacitors connected via a common terminal through said second movable contact of said input relay and one of said fixed contacts to a common terminal of said first and second double-throw relay coils, (a) the remaining free terminal of said first capacitor being connected to one of said fixed contacts of said double-throw relay and the remaining free terminal of said second capacitor being connected to the second of said fixed contacts, (iii) a first unidirectional conductor being connected in a first series circuit through said first coil between the uncommon terminal of said first capacitor and said common terminal of said double-throw relay coils, (iv) a second unidirectional conductor being connected in a second series circuit through said second coil between the uncommon terminal of said second capacitor and said common terminal of said double-throw relay coils, (a) said first and second unidirectional conductors being poled to pass current flow in the same direction through said common terminal of said relay coils, (b) said first and second capacitors, said fixed contacts, and said series circuits being poled to permit current flow to the capacitor which is in circuit to energize the said coil adapted to shift said movable contact to its alternate contact position, (v) a third unidirectional conductor connecting the uncommon terminal of said first capacitor and said first fixed contact of said double-throw relay and being poled to permit said current flow to said first capacitor;

(C) said movable contact of a first of said stages being connected to one of said fixed contacts operatively associated with said first movable contact of said input relay, and said movable contact of each said succeeding stage being connected to said first fixed contact of the preceding stage, and (D) a source of direct current having one terminal thereof connected to said first movable contact of said input relay and the other terminal thereof connected to said common terminal so that selected ones of said storage capacitors of said binary stages are charged by said source when said first movable contact and said movable contacts of said double-throw relays are electrically connected.

9. The binary circuit set forth in claim 8 wherein said first movable contact of said input relay is normally closed and said second movable contact of said input relay is normally open thereby rendering said binary circuit responsive to the trailing edge of a positive going electrical actuating signal applied to said input relay.

10. The binary circuit set forth in claim 9 further comprising:

(A) reset means for applying a switching potential solely across a corresponding coil of each of said stages, (i) said means including a source of direct current potential and a plurality of unidirectional conductors, (a) each of said last named plurality of unidirectional conductors being connected in a path between said source of potential and one said coil to which a switching potential is to be applied;

(B) an auxiliary set of double-throw contacts linked to and operating in unison with each of said first named double-throw contacts.

11. The relay binary circuit set forth in claim 8 wherein a reset relay for returning said binary stages to a predetermined condition is electrically connected into said binary circuit;

(A) said reset relay including first and second movable contacts each of which have two fixed contacts operatively associated therewith;

(i) said first movable contact being electrically connected to said source of direct current, (a) the normally closed fixed contact associated with said first movable contact being electrically connected to said first movable contact of said input relay, (b) the normally open fixed contact associated with said first movable contact being electrically connected to one of said double-throw relay coils;

(ii) said second movable contact being electrically connected to said common terminal, (a) the normally open fixed contact associated with said second movable contact being electrically connected to said common terminal of said first and second double-throw relay coils; and (B) said first movable contact of said input relay is normally closed while said second movable contact of said input relay is normally open thereby rendering said relay binary responsive to the leading edge of a positive going electrical pulse applied to said input relay.

References Cited by the Examiner

UNITED STATES PATENTS

| | | | |
|---|---|---|---|
| 2,635,197 | 4/53 | Routledge et al. | 317—151 |
| 2,954,512 | 9/60 | Hardison | 317—151 |
| 2,960,635 | 11/60 | Confalone | 317—141 |
| 3,108,206 | 10/63 | Zuklsdorf et al. | 317—151 |

SAMUEL BERNSTEIN, *Primary Examiner.*

LLOYD McCOLLUM, MAX L. LEVY, *Examiners.*